United States Patent [19]
Schreiber et al.

[11] Patent Number: 5,249,293
[45] Date of Patent: Sep. 28, 1993

[54] COMPUTER NETWORK PROVIDING TRANSPARENT OPERATION ON A COMPUTE SERVER AND ASSOCIATED METHOD

[75] Inventors: Benn L. Schreiber, Issaquah; Robert Bismuth, Redmond; Claire R. Cockcroft, Redmond; Mark C. Ozur, Redmond; Dennis J. Doherty, Bellevue, all of Wash.

[73] Assignee: Digital Equipment Corporation, Maynard, Mass.

[21] Appl. No.: 982,415

[22] Filed: Nov. 27, 1992

Related U.S. Application Data

[63] Continuation of Ser. No. 372,022, Jun. 27, 1989, abandoned.

[51] Int. Cl.⁵ ............................................. G06F 13/14
[52] U.S. Cl. ..................................... 395/650; 364/821; 364/824; 364/833; 364/834; 364/840; 364/843; 364/844
[58] Field of Search ................................ 395/650, 700

[56] References Cited

U.S. PATENT DOCUMENTS

| | | | |
|---|---|---|---|
| 4,586,134 | 4/1986 | Norstedt | 395/200 |
| 4,635,189 | 1/1987 | Kendall | 395/600 |
| 4,644,468 | 2/1987 | Doster et al. | 395/200 |
| 4,679,191 | 7/1987 | Nelson et al. | 370/84 |
| 4,698,757 | 10/1987 | Dill et al. | 395/275 |
| 4,701,848 | 10/1987 | Clyde | 395/325 |
| 4,714,996 | 12/1987 | Gladney et al. | 395/600 |
| 4,800,488 | 1/1989 | Agrawal et al. | 364/200 |
| 4,809,170 | 2/1989 | Leblang et al. | 364/200 |
| 4,941,089 | 7/1990 | Fischer | 364/200 |
| 4,949,248 | 12/1990 | Caro | 364/200 |
| 5,001,628 | 3/1991 | Johnson et al. | 364/200 |
| 5,050,070 | 9/1991 | Chastain et al. | 395/375 |
| 5,063,500 | 11/1991 | Shorter | 395/200 |

OTHER PUBLICATIONS

IBM Technical Disclosure Bulletin, "Multi-Thread Host Server for PC Support," Feb., 1986, (vol. 28 No. 9), pp. 3848-3855.

Andrew D. Birrell and Bruce J. Nelson, "Implementing Remote Procedure Calls" ACM Trans. Comp. Sys. vol. 2, No. 1, pp. 39-59 (Feb. 1984).

*Primary Examiner*—Gareth D. Shaw
*Assistant Examiner*—John Q. Chavis
*Attorney, Agent, or Firm*—Flehr, Hohbach, Test, Albritton & Herbert

[57] ABSTRACT

A method is provided for executing an application on a compute server of a computer network that includes the compute server and at least one client system, the method comprising the steps of: activating a process and a server thread running on the compute server; obtaining initial client context information from a context server running on the at least one client system; producing on the compute server a bound process bounded by the context server running on the at least one client system; executing the application in the bound process on the compute server; and in the course of the step of executing the bound process, obtaining additional client context information as requested by the application from the context server.

9 Claims, 4 Drawing Sheets

COMPUTER NETWORK PROVIDING TRANSPARENT OPERATION ON A COMPUTE SERVER AND ASSOCIATED METHOD

This application is a continuation of Ser. No. 07/372,022, filed Jun. 27, 1989, now abandoned.

BACKGROUND OF THE INVENTION

1. Field of the Invention

The invention relates generally to computer networks, and more particularly to controlling processes running on computer networks.

2. Description of the Related Art

The use of a high-performance computer system connected to a less powerful client computer system via network hardware and software is well known. The high performance computer system, commonly known as a compute server, typically is used primarily to provide additional computational power to support the client system.

One earlier system for utilizing a compute server with a client system involves batch processing. Programs that run on a client system submit requests to the compute server for it to run computation intensive programs. The compute server executes the programs, and communicates the results back to the client system.

Unfortunately, in batch processing, communication between the client system and a compute server ordinarily is not transparent to a user because, for example, a client system and a compute server typically do not share common access to data sets. Therefore, in batch processing special commands ordinarily must be provided by a user to the client system to initiate batch processing on the compute server.

Consequently, context information required by the compute server to run a program in a batch processing environment generally must be provided to it by the client system prior to a run. User context information, for example, is information that enables, defines or restricts the capabilities of a user in a system. Examples of typical user context information include: location and contents of disk files and user environment variables such as the natural language of the user.

Another earlier system for using a compute server with a client system involves a remote procedure call (RPC) distributed application computer network. In using such a distributed application network, a program is segmented at the time of its development and is implemented in multiple parts, including a part that runs on the compute server and another part that runs on the client system. Ordinarily, subroutines that require the computational power of the compute server are built into the program part that is run on the compute server. Other subroutines and the main program part generally are run on the client system. Typically, in a system using such distributed applications, the program part that runs on the client system uses the context of the client system, and the program part that runs on the compute server uses the context of the compute server. If client context information is required in the program part running on the compute server, then a program developer must code such client context into the program at the time of its development.

Unfortunately, since separate program parts run on the client system and the compute server, there often is a relatively high level of network traffic between the client and the server due to the need to transport parameters between program parts on a per call basis. Also, the client system and the compute server generally must run the same operating systems in order to ensure source and data level portability of a program.

Thus, there has been a need for a computer network in which the compute server interface is substantially transparent to the client system user and in which context information can be transparently transported on program request between the client and compute server systems.

Furthermore, there has been a need for such a method in which there is source and data level portability even when the client system and the compute server use different operating systems. The present invention meets these needs.

For additional information regarding the state of the art regarding Remote Procedure Calls, reference may be made to "Implementing Remote Procedure Calls," by Andrew D. Birrell and Bruce Jay Nelson, ACM Transactions on Computer Systems, Vol. 2, No. 1, pp. 39-59, February, 1984 (ACM 0734-2071/84/0200-0039).

SUMMARY OF THE INVENTION

The invention involves a computer network which includes a compute server and a client system and a method for controlling a process that runs on the compute server. More specifically, the method involves the transparent execution of an application program on the compute server with initiation from a client system. The method includes the step of activating a server process running on the compute server. Client context information is obtained from a context server that runs on the client system. A bound process whose lifetime is controlled by a client system user is created to run the application program. The bound process executes the application on the compute server. In the course of executing the bound process, additional client context information may be obtained from the context server as requested by the application program.

The method and the computer network of the present invention advantageously permit substantially an entire bound process to run on the compute server using context from the client system. Since the application uses client context, the use of the process on the compute server is substantially transparent to a user of the client system. Furthermore, network traffic between the client system and the compute server is reduced since substantially the entire application program runs on the compute server.

BRIEF DESCRIPTION OF THE DRAWINGS

These and other features and advantages of the present invention will be apparent to those skilled in the art from the following detailed description in conjunction with the appended drawings in which.

These and other features and advantages of the present invention will be more apparent from the following description of an exemplary embodiment thereof, as illustrated in the accompanying drawings.

DETAILED DESCRIPTION OF THE PREFERRED EMBODIMENT

The present invention comprises a novel method and a novel computer network for controlling an application program that runs on a compute server. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
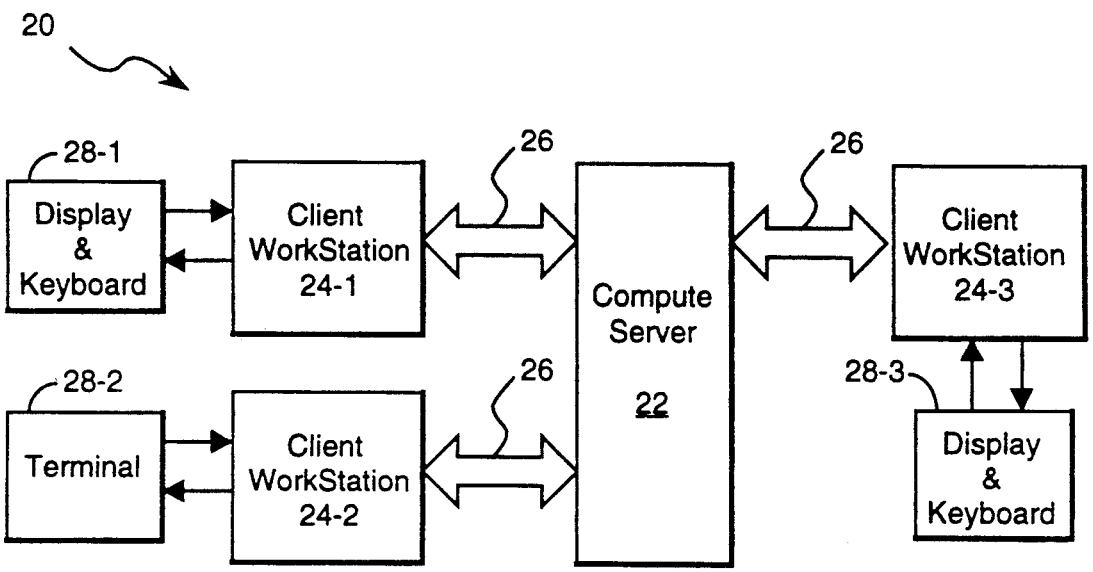
FIG. 1 is a block diagram of a computer network in accordance with the invention.

Referring to the illustrative drawings of FIG. 1, there is shown a block diagram of a computer network 20 in accordance with the present invention. The network includes a compute server 22 connected to multiple client systems 24-1, 24-2 and 24-3 by networking hardware and software 26. The client systems, for example, can be workstations such as client systems 24-1 and 24-3 or can be time share systems such as client system 24-2. The client workstations 24-1 and 24-3 are accessed by users through workstation displays and keyboards 28-1 and 28-3. The client time share system 24-2 is accessed by users through a terminal 28-2. In the presently preferred embodiment, the network software and hardware 26 permits peer-to-peer communication between the compute server 22 and the respective client systems. That is, the compute server 22 and each of the client systems possess the same network communications capabilities. The network hardware and software comprises a Remote Procedure Call (RPC) system described more fully below. The compute server typically is a high performance computer system used primarily for its computational power.

The computer network 20 advantageously permits substantially transparent client server access to and control over execution of computation intensive application programs on the compute server. More particularly, the system permits a user to make a request to a client system for application program execution and to have the application program actually execute on the compute server, although to the requesting user, the application program appears to be running on the client system. In order to achieve such transparent operation, the compute server network 20 runs the compute intensive programs, using context information obtained from the client system with which a user interacts. The user context information for a given user on a client system includes a collection of parameters that enable and/or restrict the capabilities of that user within the client system. For example, context information can include: local logical name definitions, file storage and identifiers.

Figure 2:
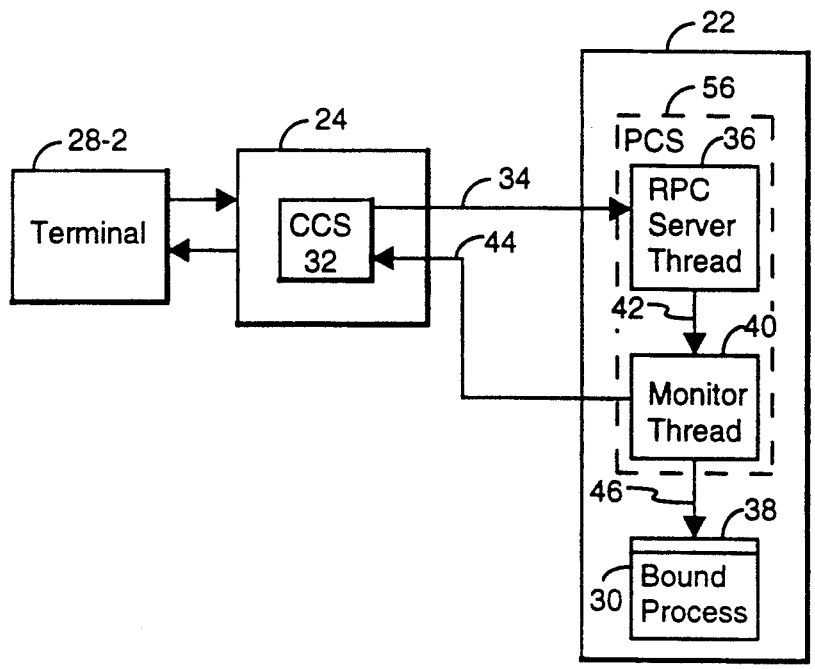
FIG. 2 is a flow diagram illustrating the steps in creating a bound process on the compute server of FIG. 1.

The illustrative flow diagram of FIG. 2 shows the steps used in accordance with the present invention to produce a bound process 30 which executes the application program. In the presently preferred embodiment, a program run on the compute server 22 in response to a user request to a client system executes as a bound process. The program is referred to as bound because its execution lifetime is under the control of a program known as a client context server 32 that runs on the client system 24 that initiates its execution, and because its runtime execution environment reflects context previously established on the client system 24 that requests its execution.

Figure 5A:
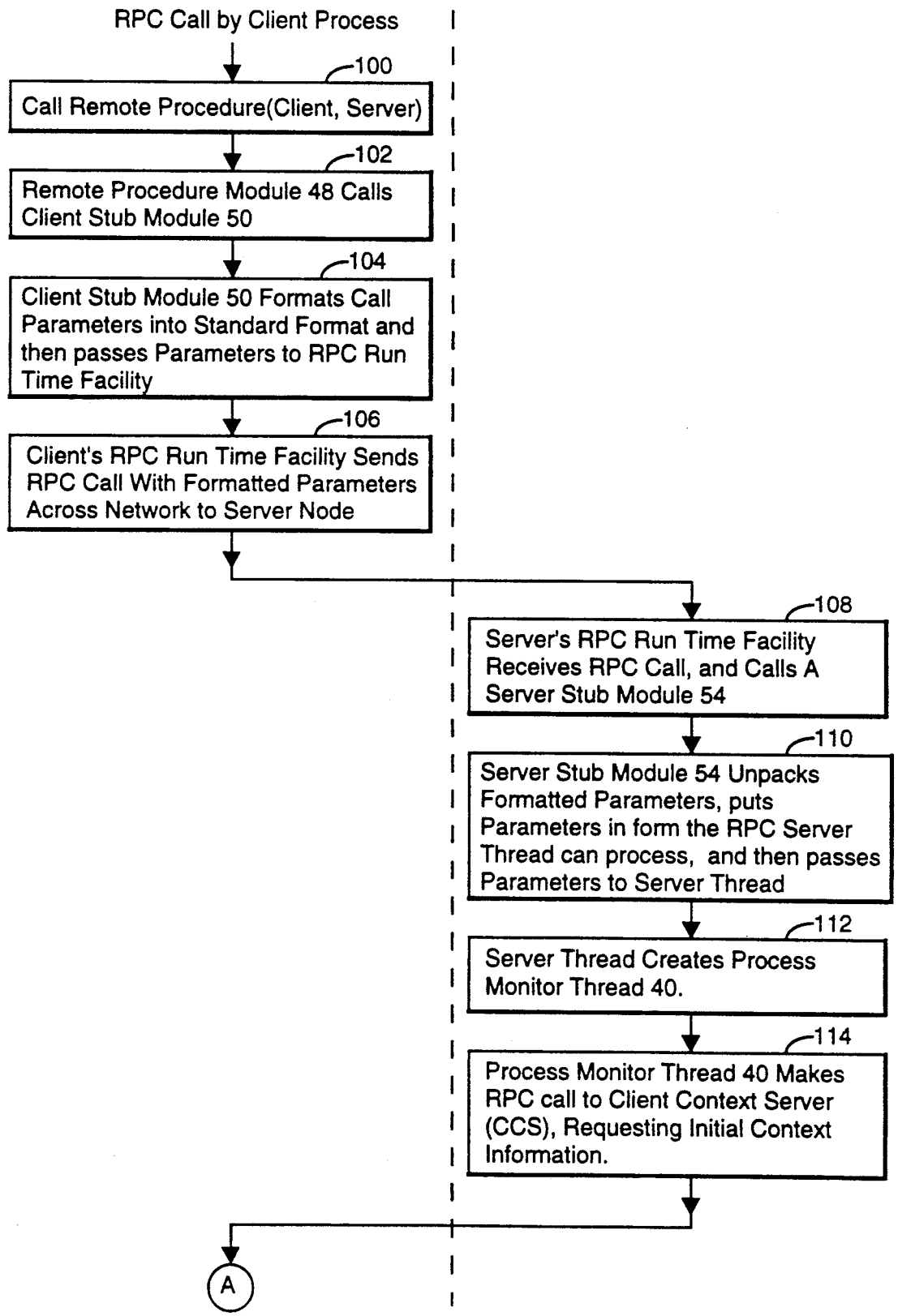
FIGS. 5A and 5B are a flow chart depicting the method of the present invention.
Figure 5B:
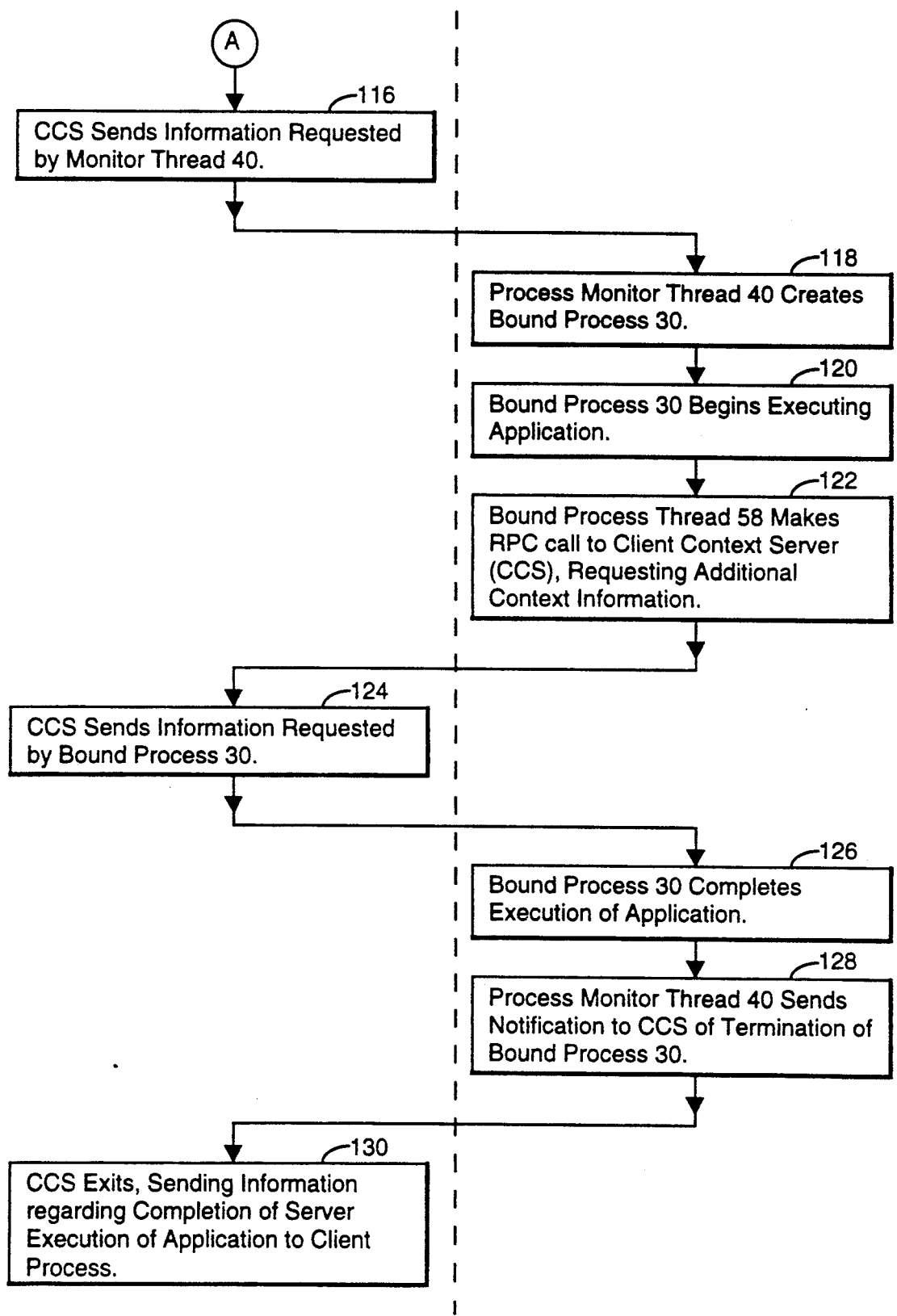

Referring to FIGS. 2, 5A and 5B, in the first step of the procedure, a user provides a request, through terminal 28, that an application program be executed (see box 100 in FIG. 5A). In response to that request, another program, the client context server (CCS) 32 executes on the client system 24. The CCS makes an RPC call, as indicated by arrow 34, to an RPC server thread 36 that runs on the compute server 22. The RPC call indicated by arrow 34 creates the process controller server (PCS) 56 which runs the RPC server thread 36 which allocates a data record 38 for the bound process 30, which at this stage has not yet been fully defined. The RPC server thread 36 also creates a process monitor thread 40 (box 112) by making a system call and passes to it a pointer to the data record 38. The RPC server thread 36 and the monitor thread 40 communicate through the data record 38, as indicated by arrows 64 and 66. The creation of the monitor thread 40 by the RPC server thread 36 is indicated by the arrow 42. After making the RPC call to the RPC server thread 36, the CCS 32 enters a wait mode.

The compute server 22 of the presently preferred embodiment can run multiple threads of execution within a single process. A thread is a software construct that is contained within a process and that possesses a register set, a program counter and a stack. In a multithreaded environment, each thread has its own set of registers, its own program counter and its own stack.

In the step indicated by the arrow 44 and box 114, the process monitor thread 40 makes an RPC call to the CCS 32 requesting initial context information about the client system. In response, the CCS 32 provides the requested information (box 116) which, for example, in the preferred embodiment includes the default directory, default volume and default natural language of the CCS 32. At this point, there resides within the compute server 22 sufficient information to produce the bound process 30. In the step indicated by arrow 46 the monitor thread 40 creates the bound process by making a system call (box 118). The bound process 30 executes the application (box 120). During execution, the CCS 32 can, via RPC, control execution of the bound process 30, provide additional client system context or file data to the bound process when requested by the application program (boxes 122 and 124) and monitor termination of the bound process.

Figure 3:
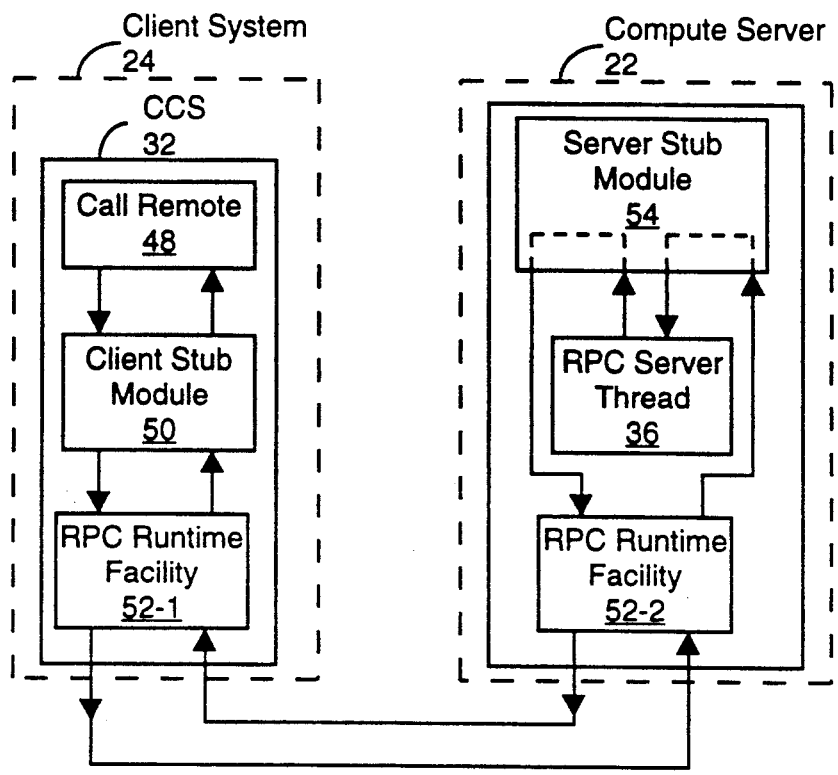
FIG. 3 is a flow diagram illustrating the steps in a Remote Procedure Call used in the computer network of FIG. 1.

The flow diagram of FIG. 3 shows the steps a Remote Procedure Call uses in a presently preferred embodiment of the invention. An RPC involves the invocation of a procedure in a different address space than that of the thread of the calling routine. For example, as explained above with regard to FIG. 2, the CCS 32 uses an RPC indicated by arrow 34 to call the RPC server thread 36. Similarly, the monitor thread 40 uses an RPC indicated by arrow 44 to obtain client system context information from the CCS 32. When a remote procedure is called, a calling routine, such as the CCS 32, is suspended, and parameters are passed across a communications medium, such as the network hardware and software 26C, to a called routine thread 36, such as the RPC server thread. A desired procedure, such as the step of creating the monitor thread 40 as indicated by arrow 42, then is executed. An underlying run-time facility handles the passing of parameters and control between threads that communicate through such an RPC mechanism.

More particularly, referring FIGS. 3, 5A and 5B, in the course of an RPC call by the CCS 32 to the RPC server thread 36, the CCS 32 calls a procedure 48 that resides in the client system 24. The call to procedure 48 results in a call to a client stub routine within a client stub module 50 (box 102). In response to the call to the client stub module 50, the called client stub routine module packages the calling arguments into a canonical format (box 104). The arguments in the canonical format then are passed to the server program using the RPC run-time facility 52-1 and 52-2 (box 106).

The RPC run-time facility 52-2 on the server program 36 receives the arguments in the canonical format, processes the arguments and calls an appropriate server stub module 54 (box 108) which includes a server stub routine that unpacks the arguments packaged by the client stub routine. The server stub of the server stub module 54 places the arguments in a form that the RPC server thread 36 on the server system 22 can process (box 110).

In response to the calling arguments unpacked by the server stub, the RPC server thread 36 creates the monitor thread 40 by using a system call (box 112) 42, as illustrated in FIG. 2.

After creating the monitor thread, the RPC server thread 36 passes status information back to the CCS 32 via a server stub in the server stub module 54, the RPC run-time facility 52-2 on the server side and the RPC run-time facility 52-1 on the client side. A client stub in the client stub module 50 on the client side receives the status information, unpacks it and places it in a form that can be processed by the CCS 32.

The RPC procedure just described is transparent to the calling procedure in the CCS 32. Thus, the CCS 32 can transparently (from the point of view of a user) create the RPC server thread 36 on the compute server 22. Similarly, the monitor thread 40 can use the RPC mechanism to obtain the initial context information required to create the bound process 30 on the compute server 22.

One skilled in the art will appreciate that the client stub module 50 and the server stub module 54 typically are a part of the operating environment in which an application program runs. They are created as part of the operating environment and are independent of the application program. A device known as a stub generator (not shown) defines the stub procedures to be accessed via the RPC. More specifically, a stub generator is used to produce respective client stubs in the client stub module 50 and respective server stubs in the server stub module 54.

Furthermore, it will be appreciated that server stubs in the server stub module 54 provide a standard program interface to an application program executing in the bound process 30 on the compute server 22. Moreover, the client stubs in the client module 50 provide a standard program interface to programs executing on the client system 24. Standard program interfaces include language run time services and other system services available to an application running on the client system 24. Thus, RPCs using the stub modules typically can be made in the same manner that standard program interfaces are used. Neither the developer of the application program nor the user of the client system 24 need be aware of the RPC interactions between the CCS 32 and the PCS 56. Consequently, such interactions are transparent both to the client system user and to the application program developer.

Figure 4:
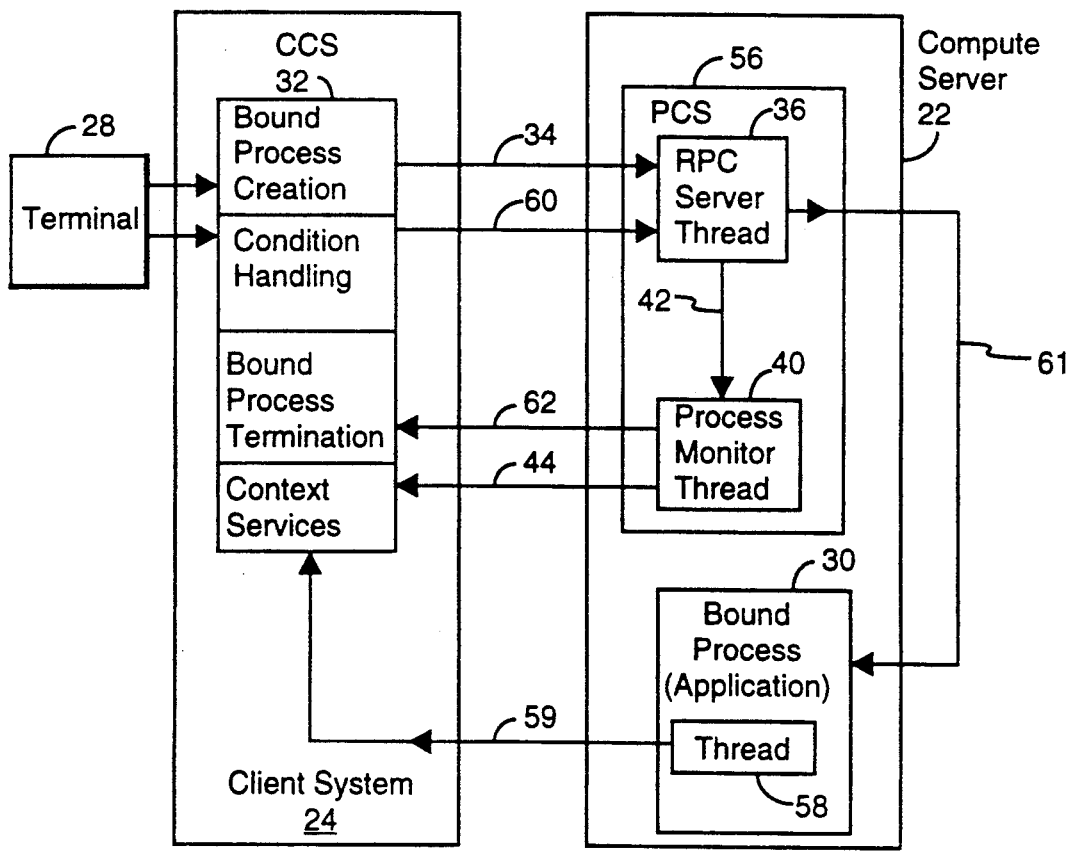
FIG. 4 is a block diagram illustrating the interface between the client system and the compute server of FIG. 1.

The illustrative block diagram of FIG. 4 shows the interface between the client context server 32 on the client system 24 and a process controller server 56 on the compute server. The process controller server 56 is a program that runs on the compute server and which includes the RPC server thread 36 and the monitor thread 40.

A user can issue commands through terminal 28. As explained above, the CCS 32 causes the RPC server thread 36 to produce the process monitor thread 40. The process monitor thread 40, in turn, communicates via RPC as indicated by arrow 44 with a Context Services portion of the CCS 32 in order to obtain the initial client context information for the bound process 30. A thread 58 in the bound process 30 achieves execution of the application program within the bound process 30. During execution of the application program within the bound process 30, the thread 58 can communicate via RPC, as indicated by arrow 59, with the Context Services portion of the CCS 32 to transparently obtain additional client context information as requested by the application. Such communication of additional client context information, for example, can include reading from a file that only exists on the client system 24.

During execution of the bound process 30, a user can exercise control over the execution via terminal 28 through the Condition Handling services of the CCS 32. The Condition Handling services handle exceptional program conditions such as a user's interrupting application program execution. In operation, a user, through terminal 28, can cause the Condition Handling services to provide an RPC call indicated by arrow 60 to the RPC server thread 36. The RPC server thread 36, in response, provides via standard system process control services a command indicated by arrow 61 to the bound process 30, for example, instructing the bound process to Stop, Debug, Suspend or Resume processing.

Meanwhile, the process monitor thread 40 monitors the execution of the bound process 30 and notifies the Bound Process Termination portion of the CCS 32 via RPC, as indicated by arrow 62, when the bound process has terminated. It also provides exit status information to the CCS 32 via RPC as indicated by the arrow 44 and boxes 126 and 128. Upon receiving exit status information, the CCS 32 exits, providing the exit status information to the user (box 130).

It will be appreciated that the novel compute server network 20 of the present invention advantageously can operate in a heterogeneous operating system environment in which each respective client system 24-1, 24-2 and 24-3 has a different operating system from the compute server 22 and from each other. Furthermore, the system 20 can engage in such operation while permitting each respective client system to transparently run respective applications within bound processes on the compute server 22. Thus, for example, referring to FIG. 1, a respective CCS on each of the client systems 24-1, 24-2 and 24-3 can use the RPC mechanism to transparently initiate and control separate bound processes running on the compute server 22.

More specifically, for example, referring to the illustrative drawing of FIG. 4, the thread 58 might request the transfer of context information indicating the natural language used by the user of the client system 24. The server 22 and the client system 24 can be running different operating systems. The bound process 30 operating on the compute server 22 using one operating system might request such information through a particular type of a procedure call germane to that operating system. The thread 58 through an RPC call to the context services of the CCS 32 indicated by arrow 59 would request the context information from the CCS 32 on the client system 24 specifying the user natural language. Through the RPC mechanism, the request, which began as a procedure call in one operating system on the compute server 22, would be translated into a procedure call on an operating system running on the client system 24 in terms understandable to that operating system. The actual language information then would be provided via RPC to the thread 58.

In a heterogeneous operating system environment, each of the client systems 24-1, 24-2, and 24-3 can seamlessly provide context information to the compute server 22 in a similar manner using the RPC mechanism. Thus, it will be appreciated that the network compute server system of the present invention advantageously permits a user to transparently initiate and control a computation intensive program on the compute server 22.

Furthermore, it will be appreciated that a bound process can run entirely on the compute server under transparent user control from a client system. Thus, network traffic between client and server is reduced, and the user need not even be aware that a program runs on the server.

The foregoing description is not intended to limit the invention which is defined in the appended claims.

What is claimed is:

1. A computer network comprising:
   a compute server;
   a multiplicity of client systems that are each coupled to said compute server, each client system including a client context server with means for sending remote procedure calls to the compute server, each remote procedure call specifying a task to be performed by said compute server on behalf of the one of said multiplicity of client systems that sent said remote procedure call;
   said compute server including:
      remote procedure call receiving means for receiving each remote procedure call sent to the compute server and for passing each said remote procedure call to a corresponding instance of a predefined control process;
   said control process instance including:
      (A) RPC sending means for sending a remote procedure call to said one client system, said remote procedure call requesting context information from said one client system;
      (B) context information receiving means for receiving context information from said one client system in response to said remote procedure call sent by said RPC sending means; and
      (C) means for creating a task execution process on the compute server which executes said specified task using said received context information;
   said task execution process including means for transmitting results of executing said specified task to said one client system;
   each said client system further including:
      client context means for responding to said remote procedure call sent by said compute server's RPC sending means by sending a predefined set of context information to the corresponding control process instance in said compute server; and
   means for receiving from the corresponding task execution process on the compute server the results of executing said specified task transmitted thereto by said task execution process.

2. The computer network of claim 1,
   said task execution process including means for sending to said one client system a second remote procedure call that requests additional client context information from said one client system, and means for receiving the requested additional client context information from said one client system; and
   each said client system further including:
      additional client context means for responding to said second remote procedure call sent by said compute server's task execution process by sending the requested additional client context information to the requesting task execution process on said compute server.

3. In a computer network, including a compute server and a multiplicity of client systems that are coupled to the compute server, a method using the compute server to perform specified tasks on behalf of the client systems, comprising the steps of:
   each client system sending remote procedure calls to the compute server, each remote procedure call specifying a task to be performed by said compute server on behalf of the one of said multiplicity of client systems that sent said remote procedure call;
   said compute server receiving each remote procedure call sent to the compute server and passing each said remote procedure call to a corresponding instance of a predefined control process;
   each said control process instance on said compute server: (A) sending a remote procedure call to said one client system, said remote procedure call requesting context information from said one client system, (B) receiving context information from said one client system, and (C) creating a task execution process on the compute server which executes said specified task using said received context information;
   said task execution process on said compute server transmitting results of executing said specified task to said one client system;
   said client system responding to said remote procedure call sent by said compute server's RPC sending means by sending a predefined set of context information to the corresponding control process instance in said compute server; and
   said client system receiving from the corresponding task execution process on the compute server the results of executing said specified task transmitted thereto by said task execution process.

4. The method of claim 3,
   said task execution process sending to said one client system a second remote procedure call that requests additional client context information from said one client system, and receiving the requested additional client context information from said one client system; and
   each said client system responding to said second remote procedure call sent by said compute server's task execution process by sending the requested additional client context information to the requesting task execution process on said compute server.

5. A computer network comprising:

a compute server;

a multiplicity of client systems that are each coupled to said compute server, each client system including a client context server with means for sending remote procedure calls to the compute server, each remote procedure call specifying a task to be performed by said compute server on behalf of the one of said multiplicity of client systems that sent said remote procedure call;

said compute server including:

remote procedure call receiving means for receiving each remote procedure call sent to the compute server and for passing each said remote procedure call to a corresponding instance of a predefined control process;

said control process instance including:

(A) RPC sending means for sending a remote procedure call to said one client system, said remote procedure call requesting context information from said one client system;

(B) context information receiving means for receiving context information from said one client system in response to said remote procedure call sent by said RPC sending means; and (C) task execution means for executing said specified task using said received context information and for then transmitting results of executing said specified task to said one client system;

each said client system further including:

client context means for responding to said remote procedure call sent by said compute server's RPC sending means by sending a predefined set of context information to the corresponding control process instance in said compute server; and means for receiving from the compute server the results of executing said specified task transmitted thereto by said task execution means.

6. The computer network of claim 5, said task execution means including means for sending to said one client system a second remote procedure call that requests additional client context information from said one client system, and means for receiving the requested additional client context information from said one client system; and each said client system further including:

additional client context means for responding to said second remote procedure call sent by said compute server's task execution means by sending the requested additional client context information to said compute server.

7. In a computer network, including a compute server and a multiplicity of client systems that are coupled to the compute server, a method using the compute server to perform specified tasks on behalf of the client systems, comprising the steps of:

(A) each client system sending remote procedure calls to the compute server, each remote procedure call specifying a task to be performed by said compute server on behalf of the one of said multiplicity of client systems that sent said remote procedure call;

(B) said compute server receiving each remote procedure call sent to the compute server and passing each said remote procedure call to a corresponding instance of a predefined control process;

(C) each said control process instance on said compute server: (A) sending a remote procedure call to said one client system, said remote procedure call requesting context information from said one client system, (B) receiving context information from said one client system, and (C) executing said specified task using said received context information. and then transmitting results of executing said specified task to said one client system;

(D) said client system responding to said remote procedure call sent by said compute server's control process instance by sending a predefined set of context information to said control process instance in said compute server; and (E) said client system receiving from the compute server the results of executing said specified task.

8. The method of claim 7, said compute server sending to said one client system a second remote procedure call that requests additional client context information from said one client system, and receiving the requested additional client context information from said one client system; and each said client system responding to said second remote procedure call by sending the requested additional client context information to said compute server.

9. The method of claim 7, said step (A) including each client system responding to predefined procedure calls by client programs by suspending execution of each client program until termination of said each client program's procedure call; and further including, after (E), said client system resuming execution of said suspended client program;

whereby said remote procedure calls are transparent to said each client program because the execution of which was suspended during performance of said remote procedure calls.

* * * * *